(12) United States Patent
Modrzewski et al.

(10) Patent No.: US 12,060,171 B2
(45) Date of Patent: Aug. 13, 2024

(54) SATELLITE, MANUFACTURING METHOD AND MODULES FOR USE IN SATELLITE ASSEMBLY

(71) Applicant: ICEYE OY, Espoo (FI)

(72) Inventors: Rafal Modrzewski, Helsinki (FI); Martin Neerot, Espoo (FI)

(73) Assignee: ICEYE OY, Espoo (FI)

( * ) Notice: Subject to any disclaimer, the term of this patent is extended or adjusted under 35 U.S.C. 154(b) by 428 days.

(21) Appl. No.: 17/292,342

(22) PCT Filed: Nov. 8, 2019

(86) PCT No.: PCT/EP2019/080756
§ 371 (c)(1),
(2) Date: May 7, 2021

(87) PCT Pub. No.: WO2020/094872
PCT Pub. Date: May 14, 2020

(65) Prior Publication Data
US 2022/0002003 A1      Jan. 6, 2022

(30) Foreign Application Priority Data

Nov. 9, 2018   (GB) ...................................... 1818326

(51) Int. Cl.
*B64G 1/10*      (2006.01)
*B64G 1/22*      (2006.01)
(Continued)

(52) U.S. Cl.
CPC .......... *B64G 1/1007* (2013.01); *B64G 1/428* (2013.01); *B64G 1/66* (2013.01); *H04B 7/18515* (2013.01); *B64G 1/1021* (2013.01); *B64G 1/223* (2023.08)

(58) Field of Classification Search
CPC .................................................. B64G 1/1007
See application file for complete search history.

(56) References Cited

U.S. PATENT DOCUMENTS 5,286,150 A * 2/1994 Buratynsky ............. B60P 7/083
24/69 WT
6,184,832 B1   2/2001 Geyh et al.
(Continued)

FOREIGN PATENT DOCUMENTS

WO            02065578 A2     8/2002

*Primary Examiner* — Hsinchun Liao
(74) *Attorney, Agent, or Firm* — DENTONS US LLP

(57) ABSTRACT

A satellite comprises a body and a generally planar structure extending from the body. One or more radio frequency "RF" antennas, an amplification system for RF signals, and a power distribution system for the amplification system are mounted on the generally planar structure. Two or all of the power distribution system, the one or more RF antennas and the amplification system are arranged on respective parallel boards (310, 312, 314) forming part of the generally planar structure (300). One or more of the parallel boards (310, 312, 314) and the components mounted thereon may be connected to another similar board to form, respectively, a larger power distribution system, antenna array or amplification system, for example arranged in a plurality of modules, each comprising at least one antenna, at least one power distribution system and at least one amplifier supported on at least two respective boards. A satellite may be manufactured by assembling the modules to form a generally planar structure, and attaching the planar structure to a satellite body.

18 Claims, 7 Drawing Sheets

(51) Int. Cl.
   *B64G 1/42*    (2006.01)
   *B64G 1/66*    (2006.01)
   *H04B 7/185*   (2006.01)

(56) References Cited

U.S. PATENT DOCUMENTS

| | | | |
|---|---|---|---|
| 6,568,638 B1 | 5/2003 | Capots | |
| 2005/0033513 A1* | 2/2005 | Gasbarro | H04B 1/082 |
| | | | 701/491 |
| 2015/0083865 A1* | 3/2015 | Nakasone | B64G 1/641 |
| | | | 244/158.6 |
| 2016/0380486 A1* | 12/2016 | Hajimiri | B64G 1/428 |
| | | | 307/104 |
| 2017/0155555 A1* | 6/2017 | Kroening | H03K 17/00 |

* cited by examiner

SATELLITE, MANUFACTURING METHOD AND MODULES FOR USE IN SATELLITE ASSEMBLY

This application is the National Stage filing under 35 USC § 371 of International Application No. PCT/EP2019/080756, filed on Nov. 8, 2019, which claims the benefit of GB Application No. 1818326.9 filed on Nov. 9, 2018, the contents of which are all hereby incorporated by reference herein in their entirety.

The present invention relates to satellites, for example communication satellites, earth observation satellites and other kinds of satellite, methods of manufacturing or assembling satellites and modules for use in satellite assembly.

BACKGROUND

Communication satellites in orbit around the earth are used in an increasing variety of applications. Communication satellites may convey information between different points on earth and/or between satellites. Earth observation satellites typically optical equipment, for example to map the earth's contours using the timing of received echo signals, some for example may carry radar equipment for sending and receiving radar signals. Such contour information may be useful in a variety of applications including observing activity of ships, detecting deforestation and detecting mining activities. A particular class of earth observation satellite is a synthetic aperture radar "SAR" satellite, well known in the art, in which the aperture is effectively bigger that its actual size. A difference between communication satellites and earth observation satellites is that one primarily conveys information whereas the other primarily generates information. These functions are not exclusive to one kind of satellite or another. A communication satellite may have some information generation capability and an earth observation satellite may have some capability to convey information received from the earth and/or another satellite.

The structure of a satellite may comprise a body on which components are mounted or in which they are housed. Solar panels may be mounted on the outside of the body to provide power to the components. A satellite may also comprise one or more generally planar structures extending from the body which may support one or more antennas. The generally planar structures may be mounted with respect to the body in such a way that they may be deployed to extend from the body, for example once the satellite is in orbit. One or more solar panels may be mounted on the generally planar structures additionally or alternatively to being mounted on the body. Such extending generally planar structures are referred to herein for convenience as "wings". It will be appreciated that "wings" as described herein do not have the same requirements for aerodynamic performance as, for example, aircraft wings.

In earth observation satellites, radar antennas may be positioned on the satellite wings. Not all satellites have extendable structures, but they are sometimes necessary. For example, some satellites require a large antenna area which is too big or impractical to be placed on a rocket without being folded. Signals received by and/or transmitted from the antennas require amplification which requires power. Amplification and power for radar antennas for example may be provided on the satellite body. In such an arrangement losses occur and additional noise is present in the signals due to the physical separation of the antennas from the amplifiers. It has therefore been proposed to include radar antennas, power distribution and amplification on one or more satellite wings. Such proposals to date have required bespoke components and specialised assembly processes.

Those designing satellites of all kinds aim to make them lighter, more efficient, better able to withstand high temperatures, and easier to modify or to repair. Some embodiments of the invention address one or more of these aims.

SUMMARY

This summary is provided to introduce a selection of concepts in a simplified form that are further described below in the Detailed Description. This summary is not intended to identify key features or essential features of the claimed subject matter, nor is it intended to be used to determine the scope of the claimed subject matter.

Some embodiments of the invention provide a satellite in which components are arranged on respective parallel boards. This may facilitate heat management and repair or replacement of the components. The boards may comprise modules of a larger structure and a satellite may comprise multiple modules. The term "board" is used herein unless otherwise stated to refer to a generally planar piece of any suitable rigid material. A board as described herein may for example be of the kind known to be used for mounting electronic components of satellites.

According to some embodiments of the invention a satellite comprises a body and a generally planar structure extending from the body. One or more radio frequency "RF" antennas, an amplification system for RF signals, and a power distribution system for the amplification system are mounted on the generally planar structure. Two or all of the power distribution system, the one or more RF antennas and the amplification system are arranged on respective parallel boards forming part of the generally planar structure. One or more of the parallel boards and the components mounted thereon may be connected to another similar board to form, respectively a larger power distribution system, antenna array or amplification system. For example parallel boards may be arranged in a plurality of modules, each module comprising at least one antenna, at least one power distribution system and at least one amplifier supported on at least two respective boards. A satellite may be manufactured by assembling the modules to form a generally planar structure; and attaching the planar structure to a satellite body. Each module may be considered a modular RF front end and some embodiments of the invention also provide a modular RF front end for a satellite comprising at least one antenna, at least one power distribution system and at least one amplifier supported on respective parallel boards in a spaced arrangement.

BRIEF DESCRIPTION OF THE DRAWINGS

Some embodiments of the invention will be described, by way of example, with reference to the following drawings, in which.

Figure 1:
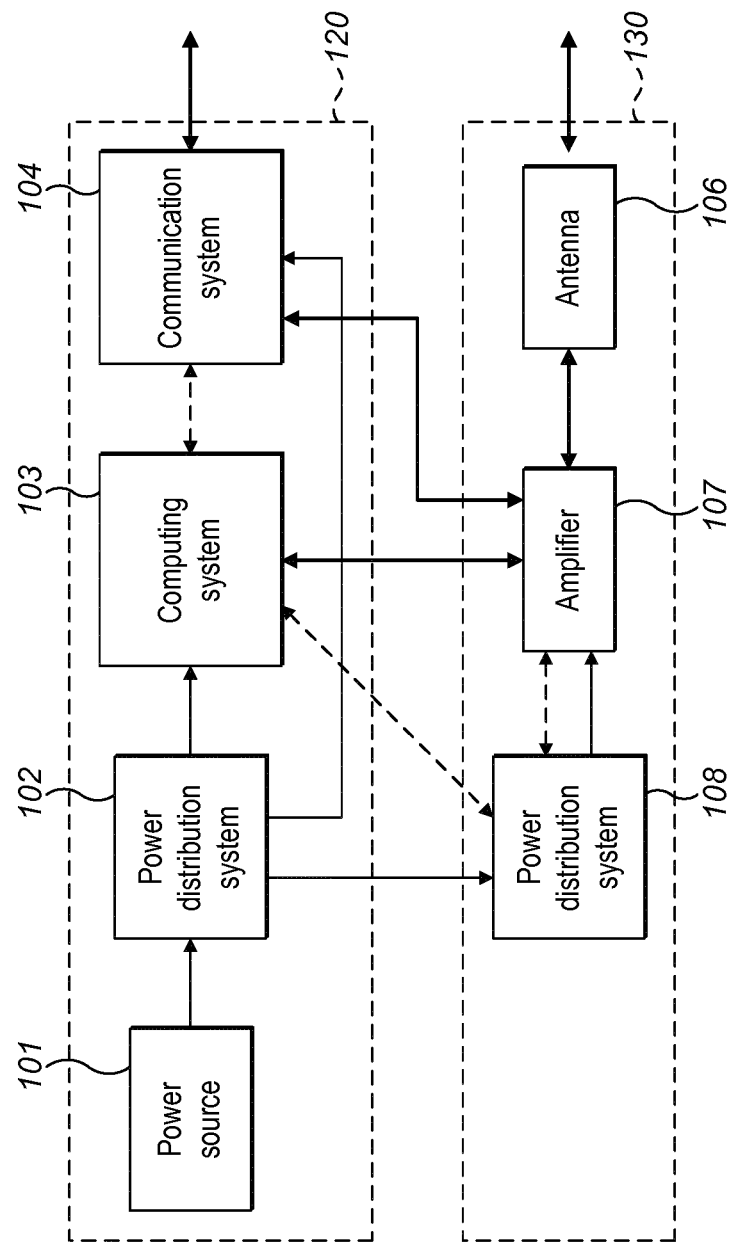
FIG. 1 is a schematic block diagram illustrating the components of a satellite according to some embodiments of the invention.

Common reference numerals are used throughout the figures to indicate similar features.

DETAILED DESCRIPTION

Embodiments of the present invention are described below by way of example only. Various embodiments of the invention are described with various features. The features may be combined as appropriate, as would be apparent to a skilled person, and may be combined with any of the aspects of the invention. The embodiments described with reference to the drawings are directed to a satellite comprising radar components but it will be appreciated that embodiments of the invention are not limited to radar.

A satellite typically comprises at least the following components: a power source, such as a solar panel or set of solar panels; a communication system and one or more antennas for transmitting and receiving signals containing data, for example to and from ground stations and/or other satellites; a computing system for processing the data; a power distribution system for supplying power from the power source to the communication system and the computing system; and one or more sensors for collecting data. In the case of earth observation satellites the sensors may include radar antennas. The sensors may also include any of image capturing devices, temperature sensors and more, as will be known to those skilled in the art. The power source may include power storage, for example in the form of one or more batteries, provided for example to enable the satellite to operate in low sunlight conditions. This is useful for example if equipment carried by the satellite is required to perform monitoring at all times.

Satellites according to some embodiments of this invention may also comprise systems not described further herein such as but not limited to a heat control system, an attitude control system to ensure that the satellite points in the correct direction, and a propulsion system.

The communication system may transmit and receive signals containing data, for example using radio frequencies, and may comprise one or more rf transceivers to convert signals, such as but not limited to voice and data, to rf for transmission or convert received rf signals to other formats such as voice and data.

The data transmitted to the communication system may comprise operating instructions for example. The data transmitted from the communication system may be derived from signals received by radar antennas or other sensors.

According to some embodiments of the invention, one or more antennas such as a radar antennas, an amplification system, and a power distribution system may be mounted on a generally planar structure on respective parallel boards, which may for example extend from the satellite body. A radar antenna may be additional to and separate from an antenna forming part of the communication system.

FIG. 1 is a schematic diagram illustrating the components of a satellite according to some embodiments of the invention. One-directional solid arrows between components are used to indicate power connections, two-directional solid arrows are used to indicate RF signal connections, and dotted lines are used to indicate data connections. In this embodiment, some components are located at the satellite body, indicated by rectangle 120, and some are located at a wing, indicated by rectangle 130. The satellite shown in FIG. 1 comprises a power source 101 and a power distribution system 102. The power source 101 and power distribution system 102 supply power to a computing system 103 and a communication system 104. The power source 101, power distribution system 102, computing system 103 and communication system 104 are collectively referred to in the art as the satellite "bus". The communication system 104 may include one or more antennas, for example located on the satellite body. Alternatively the communication 104 may send and receive signals via one or more antennas on a wing 130.

The power source 101 and power distribution system 102 shown in FIG. 1 may also supply power to one or more sensors, not shown, which may be located at the body 120. The sensors form part of what is known in the art as the satellite "payload". The number and variety of sensors may vary according to the intended use of the satellite.

In the case of an earth observation satellite, the payload may include one or more radar antennas 106 or antenna arrays, which may be located at one or more wings 130. Each antenna 106 or antenna array may have an associated amplifier 107, supplied with power via a power distribution system 108 from power source 101, for example via power distribution system 102. Both power distribution systems 102 and 108 may comprise control logic as described further herein.

The amplifier 107 has a two way data communication link with the computing system 103, in the illustrated example via the power distribution system 108, and may be configured to send data to the computing system 103 such as data relating to received radar signals. The data may be processed by the communication system 103, for example to provide earth contour data, which may then be output to the communication system 104 for onward transmission. Alternatively raw data may be output by the computing system 103 to the communication system 104 for processing by a remote computing system, on the ground or at another satellite. The computing system 103 may send data to the amplifier 107, for example via the power distribution system 108, such as operating instructions, requests for data and other signals as will be familiar to those skilled in the art.

The communication system 104 may communicate with earth stations or other satellites using radio frequency communication, light, e.g. laser communication, or any other form of communication as is known in the art.

Figure 2:
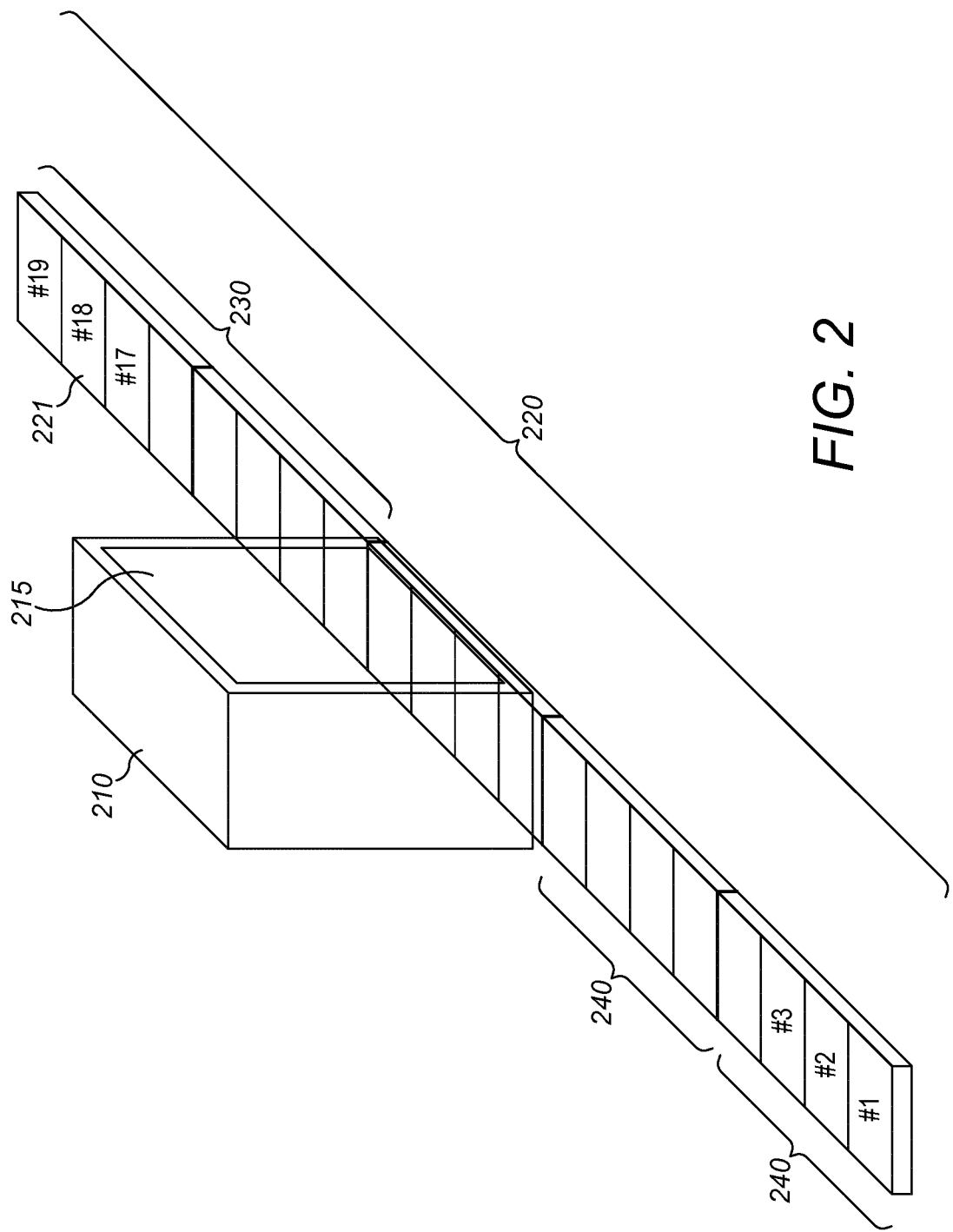
FIG. 2 is a schematic perspective view illustrating the structure of a satellite according to some embodiments of the invention.

FIG. 2 is a schematic diagram illustrating the structure of a satellite according to some embodiments of the invention. Suitable dimensions in mm are indicated by way of example but embodiments of the invention are not limited to any particular dimensions. The satellite of FIG. 2 comprises a body 210, in which some of the body 120 components of FIG. 1 may be housed, or on which some of the components of FIG. 1 may be mounted. The body 210 is also referred to in the art as a "bus" since it may house or support the bus components. Body 210 may additionally house one or more batteries. Body 210 may take any shape as known in the art. In the example of FIG. 2 the body 210 is generally cuboidal. It may be partially enclosed, for example to house and protect components. A housing may provide surfaces on which components may be mounted. In the example of FIG. 2 a solar panel 215 is mounted on one rectangular surface of the body 210.

The satellite shown in FIG. 2 comprises a generally planar structure 220 extending from the body 210. In the example of FIG. 2, structure 220 extends in two opposing directions from the body 210, for example but not necessarily in a symmetrical arrangement, to provide two wings, one of which is indicated by reference 230. The structure 220 is shown to be mounted on or adjacent to a rectangular surface of the body 210. The structure 220 may comprise an assembly of similar or identical modules as will be explained further herein, one of which is indicated by reference numeral 221. Each module may comprise a SAR module. Each module may be capable of operating independently from other modules and may serve as an RF front end for a satellite. For example in a satellite according to some embodiments of the invention no connections between modules are required. In FIG. 2 the modules are shown to be adjacent to each other in a linear arrangement. In the embodiments to be described in more detail below the modules are arranged in a single row. Embodiments of the invention are not limited in this respect and a satellite structure according to some embodiments may include any side by side arrangement of modules, in any number of rows, with the rows optionally being co-extensive.

In satellites according to some embodiments of the invention, one or more generally planar structures similar to illustrated structure 220 may be attached to a body by means of struts or other suitable means as known to those skilled in the art. The means of attachment may be articulated to facilitate movement of the planar structure 220, or one or more parts of the planar structure 220, with respect to the satellite body. Each such structure may comprise an assembly of modules. In the embodiment shown in FIG. 2, the structure 220 comprises nineteen modules 221 in a linear arrangement. Three modules are positioned against one surface of body 210 and eight modules on each side of the three modules form respective wings 230. Each wing 230 may be foldable. This is indicated in FIG. 2 where one wing is shown to comprise two panels 240 which may be hinged with respect to each other, each comprising four modules 221. Some embodiments of the invention may comprise different numbers of panels per wing or different numbers of modules per panel.

A planar structure such as structure 220 may, according to some embodiments of the invention, comprise one or more power distribution systems 108, one or more antennas 106 and an amplification system comprising one or more amplifiers 107, on respective boards for power distribution system, antenna(s) and amplifier(s). An example of such a structure is shown schematically in FIG. 3 in cross section. A module 221 according to some embodiments of the may comprise a power distribution system mounted on a first board supplying one or one or more amplifiers mounted on a second board amplifying signals to and/of from one or more antennas mounted on a third board, and may also comprise the structure shown in FIG. 3.

Figure 3:
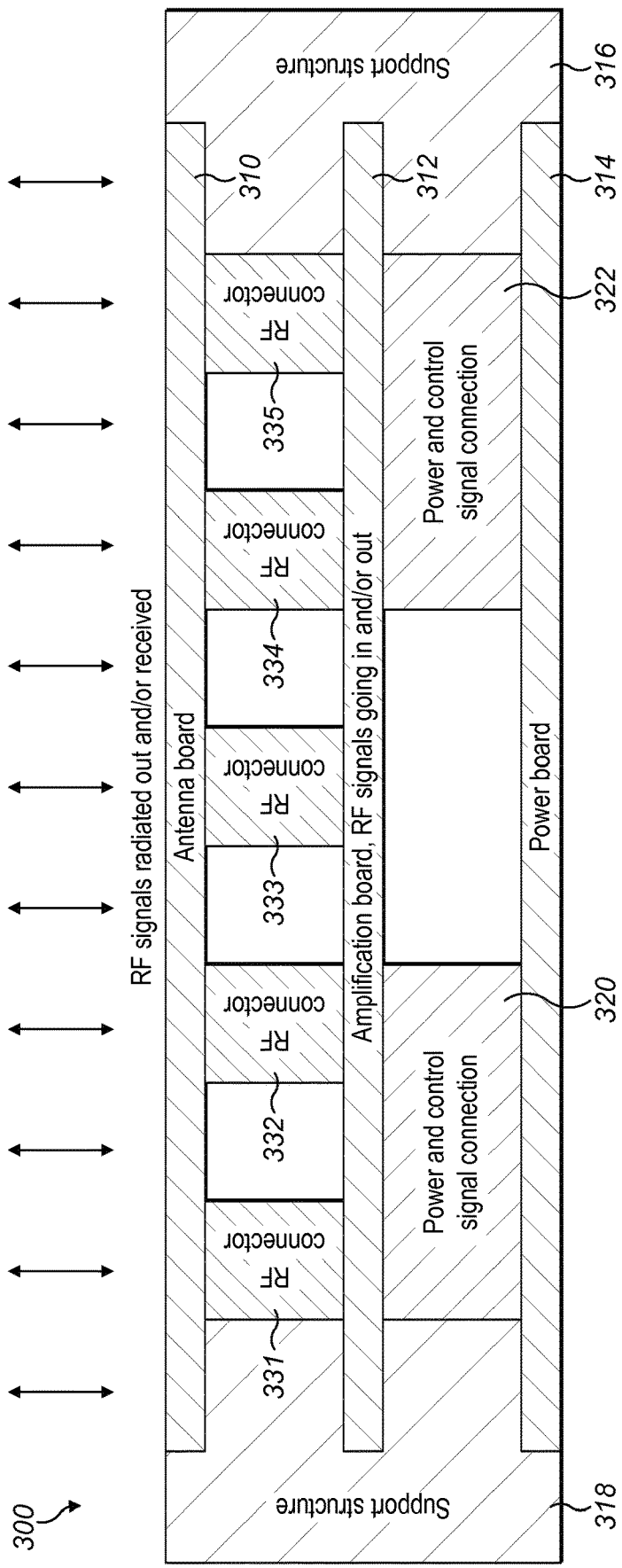
FIG. 3 is a schematic transverse cross sectional view through a wing of the satellite of FIG. 2.

The structure 300 shown in FIG. 3 comprises a board 310 on which an antenna or antenna array, not shown, is mounted. Board 310 may support a single antenna or multiple antennas such as antenna 106, for example in the form of an antenna array. The antennas may be used for radio frequency "RF" transmission, reception, or both. There are numerous methods for arranging antennas on flat surfaces that will be known to those skilled in the art and they are not described in detail herein. The structure 300 further comprises a board 312 on which one or more amplifiers, such as amplifier 107, are mounted, forming an amplification system. Also mounted on board 312 may be RF network signalling input and output components. The one or more amplifiers may each comprise electronic components as known in the art and not shown in detail, mounted on the board 312. Alternatively an amplifier may comprise an integrated or otherwise self contained unit or circuit mounted on board 312. The structure 300 further comprises a further board 314 on which a power distribution system, such as power distribution system 102, is mounted. The power distribution system may comprise any of one or more transformers, capacitors and other components as known in the art of power supply and distribution. As with the amplification, power distribution components may be individually mounted on the board 314 or a power distribution system may comprise an integrated or otherwise self contained unit or circuit mounted on board 314. The boards may be printed circuit boards "PCBs" as is known in the art.

The structure of FIG. 3 comprises support elements 316 and 318 supporting opposing edges of the boards 310, 312, 314 in a spaced apart arrangement. In the embodiment of FIG. 2, the support elements may be positioned along the longitudinal edges of the planar structure 220, or may be positioned around the side surfaces of a module 221 to provide an integrated support structure wholly or partially surrounding the boards 310, 312, 314. In the embodiment of FIG. 3, boards 310, 312 and 314 are arranged so as to be parallel and spaced from each other, with their edges parallel and substantially aligned. The support elements 316, 318 comprise structures for receiving the edges of the boards such as slots or shoulders. In the structure of FIG. 3, the central board 312 is received in slots in the support elements and the other boards 310 and 314 are received on shoulders formed in the support elements 316, 318. Additional support elements, not shown, may be provided between the illustrated support elements 314, 318. A number of modules 221, for example forming an antenna panel 240, may be mounted on a frame or other support in which case additional support elements may be provided beneath the power distribution board 314 to support the modules with respect to the frame or other support.

The support elements 316 and 318 provide stability and help to reduce vibrations of the boards with respect to each other. Further, they may act as a heat sink between the power board 318 and amplification board 316, which may enable high power operations, particularly when the amplification system is not used continuously. For example, printed circuit boards may comprise conducting, e.g. copper, layers and vias, and gold or silver coating that help tot spread the heat and deliver it to the support elements 316 and 318. Amplifiers may be a particular source of heat and therefore the ability to sink this heat efficiently is advantageous. The support elements may for example be made of a heat conducting material such as a metal. The respective boards 310, 312, 314 may tightly contact the support elements 316 and 318 since the more surface areas are in contact, the better the heat sinking.

The one or more power supplies on board 314 are attached and connected to the one or more amplifiers on board 312 via connectors, shown schematically by blocks 320, 322 in FIG. 3. The one or more power supplies may receive DC power and control signals from a power source, such as a solar panel or battery, and output power, for example pulsed and/or AC, in the form of control signals for use in manipulating RF signals received via one or more antennas on board 310. The control signals may include but are not limited to switching between transmit and receive, turning on transmit and receive amplifiers, and phase shifting radar signal (this causes the effective direction of the radar to change). The connectors 320, 322 may carry only power or digital signals that are related to passing and/or amplification of RF signals.

The antenna or antenna array on board 310 may be configured to receive or transmit RF signals conveyed to or from them, via RF connectors shown schematically by blocks 331-335. These may be standard RF connectors such as snap fit or push connectors. The connectors 331-335 connect the antenna or antenna array to one or more amplifiers on board 312 where the RF signals are amplified. In receive mode, the amplified signals may output by the amplifiers to the computing system 103. Sensor signals may be encoded for transmission, either at the computing system 103 or at the communication system 104.

The structure of FIG. 3 may be arranged such that, in use, the board 312 on which one or more amplifiers are mounted is positioned between the boards 310 and 314.

Figure 4:
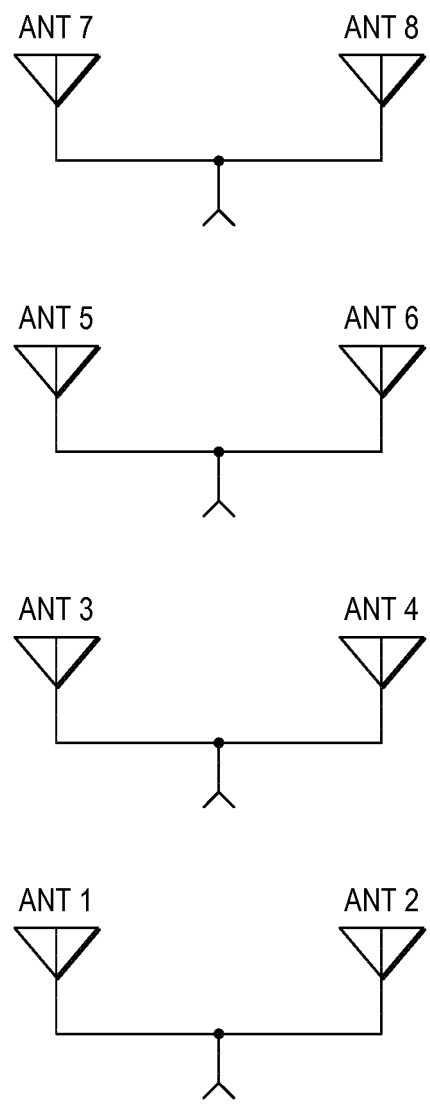
FIG. 4 is a schematic diagram showing the principle components mounted on an antenna board according to some embodiments of the invention.

FIG. 4 is a schematic diagram showing the principle components mounted on an antenna board according to some embodiments of the invention. These components, or an assembly of modules each comprising a board supporting the components of FIG. 4, may perform the functions of the antenna 106 of FIG. 1. In FIG. 4, four RF ports are shown by way of example, each feeding two antennas ANTI-ANTS. The number of ports and antennas fed per port may vary in other embodiments. In one possible embodiment, the antennas are mounted on one side of the board and connected to RF ports on the opposite side of the board.

Figure 5:
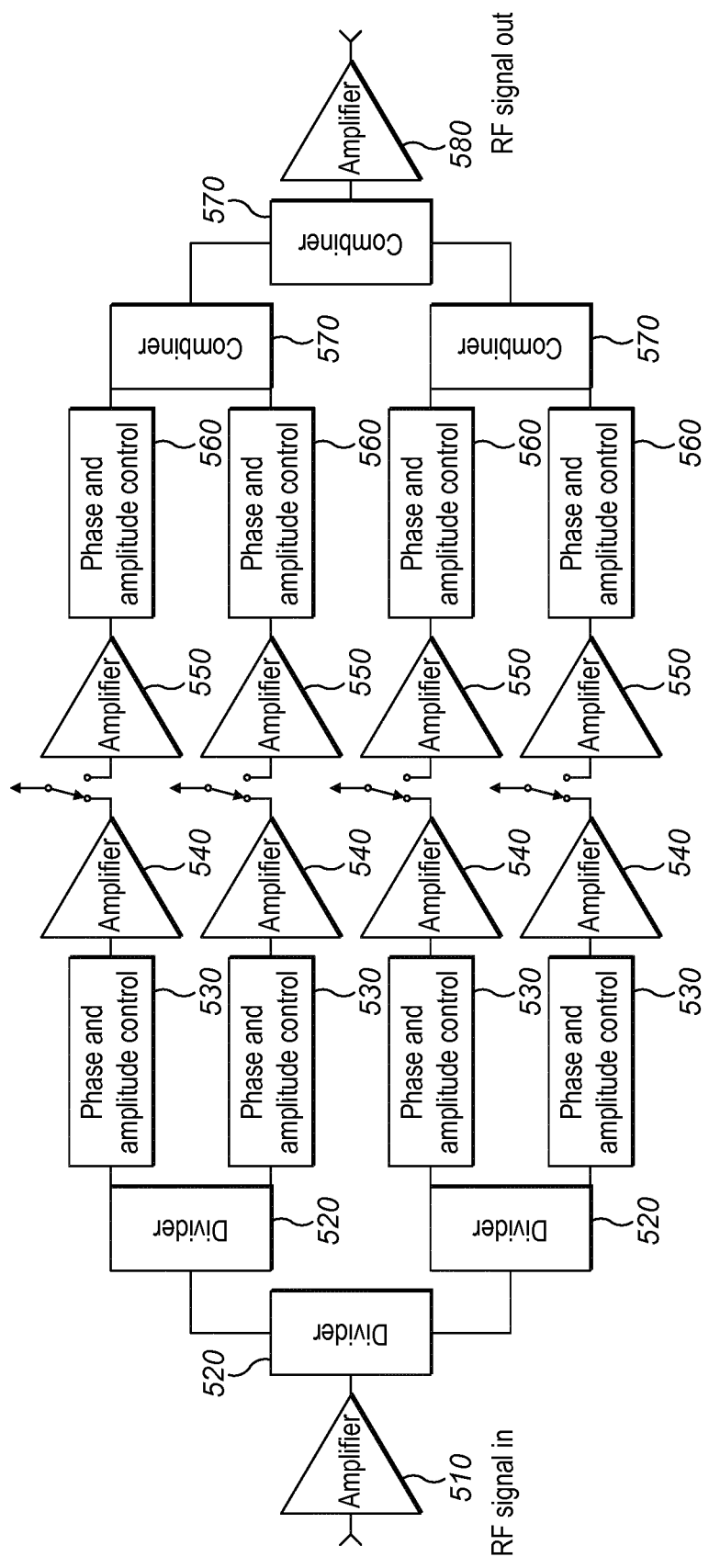
FIG. 5 is a schematic diagram showing the principle components mounted on an amplification board according to some embodiments of the invention.

FIG. 5 is a schematic diagram showing the principle components mounted on an amplification board according to some embodiments of the invention. These components, or an assembly of modules each comprising a board supporting the components of FIG. 5, may perform the functions of the amplifier 107 of FIG. 1. The illustrated components comprise a transmit chain and a receive chain. In the transmit chain, an RF signal is input, pre-amplified, divided, subjected to phase and amplitude control, amplified, and then routed to RF connectors such as connectors 331-335 in FIG. 3 which connect the amplification board 312 to the antenna board 310. In the embodiment of FIG. 5, an input signal is pre-amplified at amplifier 510, divided at dividers 520, subject to phase and amplitude control at phase and amplitude control circuits 530 and amplified at amplifiers 540 to provide four amplified output signals. The number of antennas 510 receiving input signals and ratio of input signals to output signals may vary according to different embodiments of the invention.

In the embodiment of FIG. 5, the amplification system comprises a transmit chain and a receive chain, each chain comprising a set of amplifiers 540 or 550 connected to an antenna. Each antenna may be connected to a single amplifier 540 or 550 or both. Each amplifier 540 or 550 may be connected to more than one of the plurality of antennas thereby saving the need for a separate input or output amplifier for each antenna. In other words there may be a one to many relationship between amplifiers and antennas.

Figure 6:
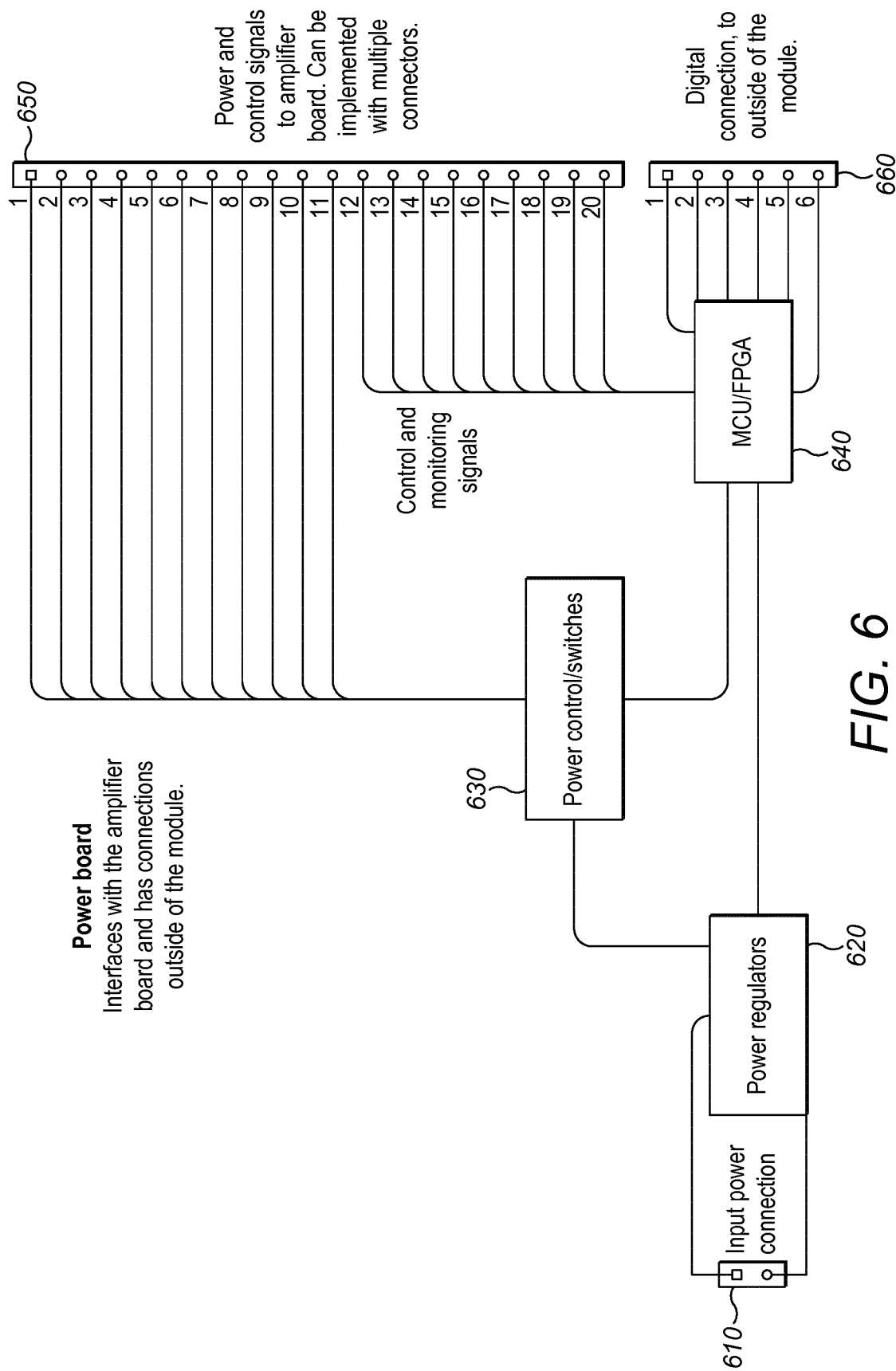
FIG. 6 is a schematic diagram showing the principle components mounted on a power distribution board according to some embodiments of the invention.

FIG. 6 is a schematic diagram showing the principle components mounted on a power distribution board according to some embodiments of the invention. These components, or an assembly of modules each comprising a board supporting the components of FIG. 6, may perform the functions of power distribution system 108 in FIG. 1. In FIG. 6, the power board includes an input power connection 610 and one or more power regulators 620 which supply power to power control switches 630 and a microcontroller "MCU" or field programmable gate array "FPGA" 640. The power control switches 630 and the MCU/FPGA 640 provide power and control signals to amplifier on the amplifier board by a plurality of power connections 650. The MCU/FPGA 640 also provides digital connections to components outside the planar structure 220 or outside the module 221. According to some embodiments of the invention, the functions of the MCU/FPGA may be implemented at the satellite bus rather than at the wing, and may use different logic components other than a MCU or FPGA. In the case of an earth observation satellite for example, the current running to the panels may be constant when taking an image. A power distribution board, for example in a module 221, may take the constant current and create a buffer, to allow for fluctuation in current consumption when switching between transmitting which requires higher power and receiving which requires less power. In this connection it is noteworthy that for a typical SAR the proportion of time in receiving, or "listening" mode may greatly exceed the time in transmitting mode. The power requirement can fluctuate between tens and hundreds of Watts at a rate of thousands of switches per second. The purpose of power distribution is to take relatively constant incoming power and provide variable outgoing power. The power distribution board may comprise capacitors and current control components. Varying current can lead to varying magnetic fields which interfere with the earth's magnetic field and interfere with the operation of the satellite. One purpose of the power distribution components is to mitigate this effect.

The separation of antenna, amplification and power distribution components by providing them on respective boards has several advantages. The boards or components on the respective boards can be tested separately prior to installation, easily removed for replacement and testing, and developed and improved separately from the components on the other boards. For example very basic adapter boards may be used for testing. Therefore parts of the system may be readily upgraded. For example, with suitable design it is possible for the board on which the antenna(s) are mounted to be swapped without affecting the components on the other boards. This is in contrast to existing structures which are generally in more discrete stages, which results in losses and difficulties in assembly; or more integrated, which results in a costly manufacturing process. In the example of FIG. 2, nineteen modules are provided. Each module may have about twenty amplifiers in both the receive and transmit chains. Each amplifier may be connected to one or more antennas. Each module may be tested separately. This is advantageous over, for example, an arrangement in which switching and receive and transmit amplifiers are provided for each antenna, for example in terms of time taken testing. Another benefit of providing components on different boards is that each board may require different numbers of layers in the basic PCB and therefore to produce one board with all of the components is complicated. According to some embodiments of the invention, while the number of layers in different PCBs varies, for example in a single module, the surface area is the same. For a module with a fixed volume, the use of separate boards may be more space efficient than using one board with the required number of layers for all components since it will have less surface area. Further, by separating antenna, amplification and power distribution components, different manufacturers or manufacturing processes may be used to manufacture different boards. It should be noted here that embodiments of the invention are not limited to two or three board structures as described herein and embodiments of the invention may include additional boards on which additional components are mounted.

Some embodiments of the invention may lead to faster, cheaper and distributed development cycles. They may reduce the possibility that failures or slowdowns in developing power/amplification/antenna systems slow down the rest of development or testing. The thermal control may be simple to make thermal control. Embodiments may provide for high power operations for short time with low mass.

According to some embodiments of the invention, one or more of boards 310, 312, 314 and the components mounted thereon may be connectable to another similar board to form, respectively a larger power distribution system, antenna array or amplification system. In other words, a planar structure according to some embodiments may comprise an assembly of power distribution system modules, and/or an assembly of antenna modules and/or an assembly of amplifier modules. In such an embodiment, any of the power distribution system, the one or more antennas and the amplification system may be arranged on respective boards which are connected to each other.

According to some embodiments of the invention, the planar structure may comprise an assembly of modules each comprising a power distribution system, one or more antennas and an amplification system arranged on respective parallel boards.

Any of the modules described herein may be connected side by side by suitable connectors.

A satellite according to some embodiments of the invention may be made lighter than current satellites for similar purposes. For example, the positioning of the amplifiers adjacent to the antennas rather than on the satellite body avoids the need for waveguides to distribute signals to the body, which can contribute significantly to the weight of the overall satellite structure.

Figure 7:
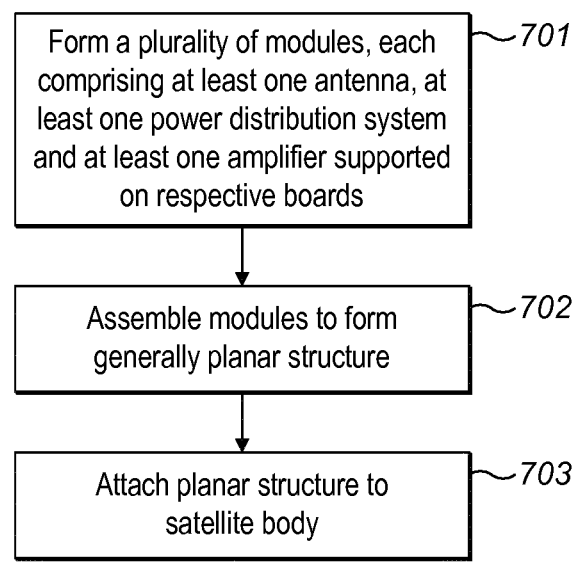
FIG. 7 is a flow chart of a method according to some embodiments of the invention.

FIG. 7 illustrates a method of manufacturing a satellite according to some embodiments of the invention. The method commences with operation 701, the formation of a plurality of modules, e.g. nineteen modules for the embodiment shown in FIG. 2, each comprising at least one antenna, at least one power distribution system and at least one amplifier supported on respective boards. Alternative embodiments of the invention may comprise obtaining the modules pre-manufactured. The modules may then be assembled at operation 702 to form a generally planar structure. The planar structure may be attached to a satellite body at operation 703.

The term 'computing system' is used herein to refer to any device or group of devices with processing capability such that it/they can execute instructions. Those skilled in the art will realise that such processing capabilities are incorporated into many different devices and therefore the term 'computing system' as used herein may include PCs, servers, mobile telephones, personal digital assistants and many other devices.

The components described herein are not necessarily physically separated from each other unless otherwise stated, and the functionality of components illustrated in the figures may be distributed or shared between different or the same physical devices. For example, some of the functions of a communication system may be performed by a computing system and vice versa.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" may encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of operations of methods described herein is exemplary, but the operations may be carried out in any suitable order, or simultaneously where appropriate. Additionally, operations may be added or substituted in, or individual operations may be deleted from any of the methods without departing from the scope of the subject matter described herein. Aspects of any of the examples described above may be combined with aspects of any of the other examples described to form further examples without losing the effect sought.

It will be understood that the above description of a embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A satellite comprising:
 a body;
 a source of power;
 at least one generally planar structure attached to and extending from the body; and
 mounted on the generally planar structure, one or more radio frequency ("RF") antennas, an amplification system for RF signals, and a power distribution system for distributing power from the source of power to the amplification system, wherein,
at least the amplification system and at least one of the power distribution system or the one or more RF antennas are arranged on respective parallel boards forming part of the generally planar structure,
the one or more antennas are connected to one or more amplifiers of the amplification system via RF connectors,
the parallel boards are positioned in a spaced apart arrangement,
support elements maintaining the spacing between the parallel boards, and
the support elements contact at least the parallel board on which the amplification system is arranged and act as a heat sink for the amplification system that conducts heat away from the at least one amplification system.

2. The satellite of claim 1, wherein at least one of the parallel boards and components mounted thereon is connected to another similar board to form, respectively, a larger power distribution system, antenna array comprised of two or more RF antennas, or amplification system.

3. The satellite of claim 1, wherein the generally planar structure comprises an assembly comprising a plurality of modules, each module comprising at least one RF antenna, at least one power distribution system, and at least one amplifier system arranged on at least two respective parallel boards.

4. The satellite of claim 3, wherein the generally planar structure comprises at least two panels each comprising at least two modules, wherein the panels are hinged with respect to each other to enable the generally planar structure to be folded.

5. The satellite of claim 3, wherein the modules are adjacent to each other in a linear arrangement.

6. The satellite of claim 3, wherein each module is configured to operate independently of the other modules.

7. The satellite of claim 1, wherein the RF antennas are radar antennas and the RF signals are radar signals.

8. The satellite of claim 1 comprising a plurality of antennas, wherein:
the amplification system comprises a transmit chain and a receive chain, each chain comprising a plurality of transmit and receive amplifiers connected to more than one RF antenna, and
each RF antenna is connected to a single transmit or receive amplifier.

9. A modular RF front end for a satellite as claimed in claim 1, the modular front end comprising at least one antenna, at least one power distribution system, and at least one amplifier supported on respective spaced-apart parallel boards.

10. A front end as claimed in claim 9 further comprising one or more connectors for connection of the modular RF front end to another similar modular RF front end.

11. The satellite of claim 1, wherein:
the power distribution system is arranged on a first parallel board, the amplification system is arranged on a second parallel board, and the one or more RF antennas are arranged on a third parallel board; and
the second parallel board is positioned between the first parallel board and the third parallel board.

12. The satellite of claim 11, wherein, the first parallel board, the second parallel board, and the third parallel board are spaced apart in a stacked arrangement.

13. The satellite of claim 1, wherein:
the power distribution system is arranged on a first parallel board, the amplification system is arranged on a second parallel board, and the one or more RF antennas are arranged on a third parallel board; and
the first parallel board, the second parallel board, and the third parallel board are spaced apart in a stacked arrangement.

14. A method of manufacturing a satellite comprising:
obtaining a plurality of modules, each module comprising at least one antenna, at least one power distribution system, and at least one amplification system supported on respective boards, each power distribution system structured for distributing power from a source of power to the amplification system;
assembling the modules to form a generally planar structure; and
attaching the planar structure to a satellite body having the source of power,
wherein,
each amplification system includes at least one amplifier,
at least the at least one amplification system and at least one of the at least one power distribution system or the at least one RF antenna are arranged on respective boards forming part of the generally planar structure,
the at least one antenna is connected to the at least one amplifier of the at least one amplification system via RF connectors,
the boards are positioned in a spaced apart arrangement,
support elements maintain the spacing between the boards, and
the support elements contact at least the board on which the at least one amplification system is arranged and act as a heat sink for the at least one amplification system that conducts heat away from the at least one amplification system.

15. The method of claim 14 comprising forming the plurality of modules.

16. The method of claim 14, wherein, for each module:
the power distribution system is arranged on a first board, the amplification systems is arranged on a second board, and the one or more RF antennas are arranged on a third board; and
the second board is positioned between the first board and the third board.

17. The method of claim 16, wherein, for each module, the first board, the second board, and the third board are spaced apart in a stacked arrangement and parallel to each other.

18. The method of claim 14, wherein, for each module the boards are spaced apart in a stacked arrangement and parallel to each other.

* * * * *